US010289725B2

(12) United States Patent
Winkler et al.

(10) Patent No.: US 10,289,725 B2
(45) Date of Patent: May 14, 2019

(54) ENTERPRISE DATA WAREHOUSE MODEL FEDERATION

(71) Applicants: Patrick Winkler, Heidelberg (DE); Klaus Nagel, Heidelberg (DE); Jascha Kanngiesser, Karlsruhe (DE)

(72) Inventors: Patrick Winkler, Heidelberg (DE); Klaus Nagel, Heidelberg (DE); Jascha Kanngiesser, Karlsruhe (DE)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 14/553,322

(22) Filed: Nov. 25, 2014

(65) Prior Publication Data

US 2016/0147850 A1    May 26, 2016

(51) Int. Cl.
*G06F 17/30* (2006.01)

(52) U.S. Cl.
CPC .. *G06F 17/30563* (2013.01); *G06F 17/30292* (2013.01); *G06F 17/30569* (2013.01); *G06F 17/30575* (2013.01)

(58) Field of Classification Search
None
See application file for complete search history.

(56) References Cited

U.S. PATENT DOCUMENTS

| 7,263,520 | B2 | 8/2007 | Biedenstein et al. |
| 7,356,524 | B2 | 4/2008 | Zurek et al. |
| 7,620,642 | B2 | 11/2009 | Zurek et al. |
| 7,650,326 | B2 | 1/2010 | Biedenstein et al. |
| 7,668,803 | B2 | 2/2010 | Zurek et al. |
| 8,655,923 | B2 | 2/2014 | Zurek et al. |
| 8,700,679 | B2 | 4/2014 | Nagel et al. |
| 8,707,023 | B2 | 4/2014 | Nagel et al. |
| 8,793,213 | B2 | 7/2014 | Nagel et al. |
| 2004/0006585 | A1* | 1/2004 | Paulus ............... G06Q 10/10 709/200 |
| 2004/0122827 | A1* | 6/2004 | Cazemier ......... G06F 17/30592 |
| 2007/0220004 | A1* | 9/2007 | Fifield ............. G06F 17/30421 |
| 2009/0024551 | A1* | 1/2009 | Agrawal .......... G06F 17/30371 706/47 |
| 2011/0055147 | A1* | 3/2011 | Joerg ................. G06F 9/4843 707/602 |
| 2012/0101978 | A1* | 4/2012 | Wilkinson ....... G06F 17/30563 707/602 |

(Continued)

*Primary Examiner* — Alex Gofman
(74) *Attorney, Agent, or Firm* — Fish & Richardson P.C.

(57) ABSTRACT

The present disclosure describes methods, systems, and computer program products for providing data warehouse model federation. One computer-implemented method includes receiving a request to transform a first semantically enriched model to a second semantically enriched model, wherein the first semantically enriched model operates in a first data warehouse and the second semantically enriched model operates in a second data warehouse; identifying a set of data associated with the first semantically enriched model, wherein the set of data is stored in the first data warehouse; providing access to the set of data associated with the first semantically enriched model from the second data warehouse; creating the second semantically enriched model based on the first semantically enriched model using an interface of the second data warehouse; and deploying the second semantically enriched model in the second data warehouse.

17 Claims, 3 Drawing Sheets

(56) References Cited

U.S. PATENT DOCUMENTS

| | | | |
|---|---|---|---|
| 2013/0036349 A1* | 2/2013 | Hui | G06F 17/2247 |
| | | | 715/234 |
| 2013/0212711 A1* | 8/2013 | Radkowski | G06F 21/6236 |
| | | | 726/30 |
| 2013/0275362 A1 | 10/2013 | Nagel et al. | |
| 2013/0311456 A1 | 11/2013 | Winkler et al. | |
| 2013/0346429 A1 | 12/2013 | Bratz et al. | |

* cited by examiner

ENTERPRISE DATA WAREHOUSE MODEL FEDERATION

BACKGROUND

A data warehouse can hold information and make the information semantically enriched. The data warehouse can make a semantically enriched model available to some or all of the users that can access the data warehouse. For example, an enterprise data warehouse can store data related to business information and semantically enriched models associated with the data. A client can create, modify, or delete the semantically enriched models. In some instances, a client can be software that is used to interact with the data warehouse. Typically, the access to a semantically enriched model in a data warehouse is through an interface that is proprietary to the data warehouse.

SUMMARY

The present disclosure relates to computer-implemented methods, computer-readable media, and computer systems for data warehouse model federation. One computer-implemented method includes receiving a request to convert a first semantically enriched model to a second semantically enriched model, wherein the first semantically enriched model operates in a first data warehouse and the second semantically enriched model operates in a second data warehouse; identifying a set of data associated with the first semantically enriched model, wherein the set of data is stored in the first data warehouse; providing access to the set of data associated with the first semantically enriched model from the second data warehouse; creating the second semantically enriched model based on the first semantically enriched model using an interface of the second data warehouse; and deploying the second semantically enriched model in the second data warehouse.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising: identifying a first security policy associated with the first semantically enriched model; creating a second security policy based on the first security policy and the interface of the second data warehouse; and deploying the second security policy in the second data warehouse.

A second aspect, combinable with any of the previous aspects, further comprising: determining that the first semantically enriched model is updated; updating the second semantically enriched model based on the updated first semantically enriched model; and deploying the updated second semantically enriched model in the second data warehouse.

A third aspect, combinable with any of the previous aspects, wherein providing access to the set of data comprises replicating the set of data in the second data warehouse.

A fourth aspect, combinable with any of the previous aspects, wherein providing access to the set of data comprises providing a virtual access to the set of data from the second data warehouse A fifth aspect, combinable with any of the previous aspects, wherein creating the second semantically enriched model and further comprising: creating a first definition of the first semantically enriched model; identifying a first data type in the first definition that is not compatible with the interface of the second data warehouse; transforming the first data type into a second data type that is compatible with the interface of the second data warehouse; creating a second definition based on the first definition, wherein the second definition comprises the second data type; and creating the second semantically enriched model based on the second definition using the interface of the second data warehouse.

A sixth aspect, combinable with any of the previous aspects, wherein the first and the second definitions are formatted according to Extensible Markup Language (XML).

The subject matter described in this specification can be implemented in particular implementations so as to realize one or more of the following advantages. First, source data warehouse semantically enriched models can be made available through proprietary interfaces of other data warehouses; increasing availability/usability of the source data warehouse. Second, applications can avoid interacting with multiple data warehouse proprietary interfaces and reduce complexities. Third, switching between different applications across data warehouses can be avoided. Fourth, a user can reduce the complexity incurred in re-defining the same semantic models and security policies in multiple data warehouses; reducing redundancy and increasing consistency throughout a data warehouse landscape. Fifth, a local data warehouse user can reuse a semantically enriched model in a central data warehouse to create/enhance semantically enriched models in the local data warehouse.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
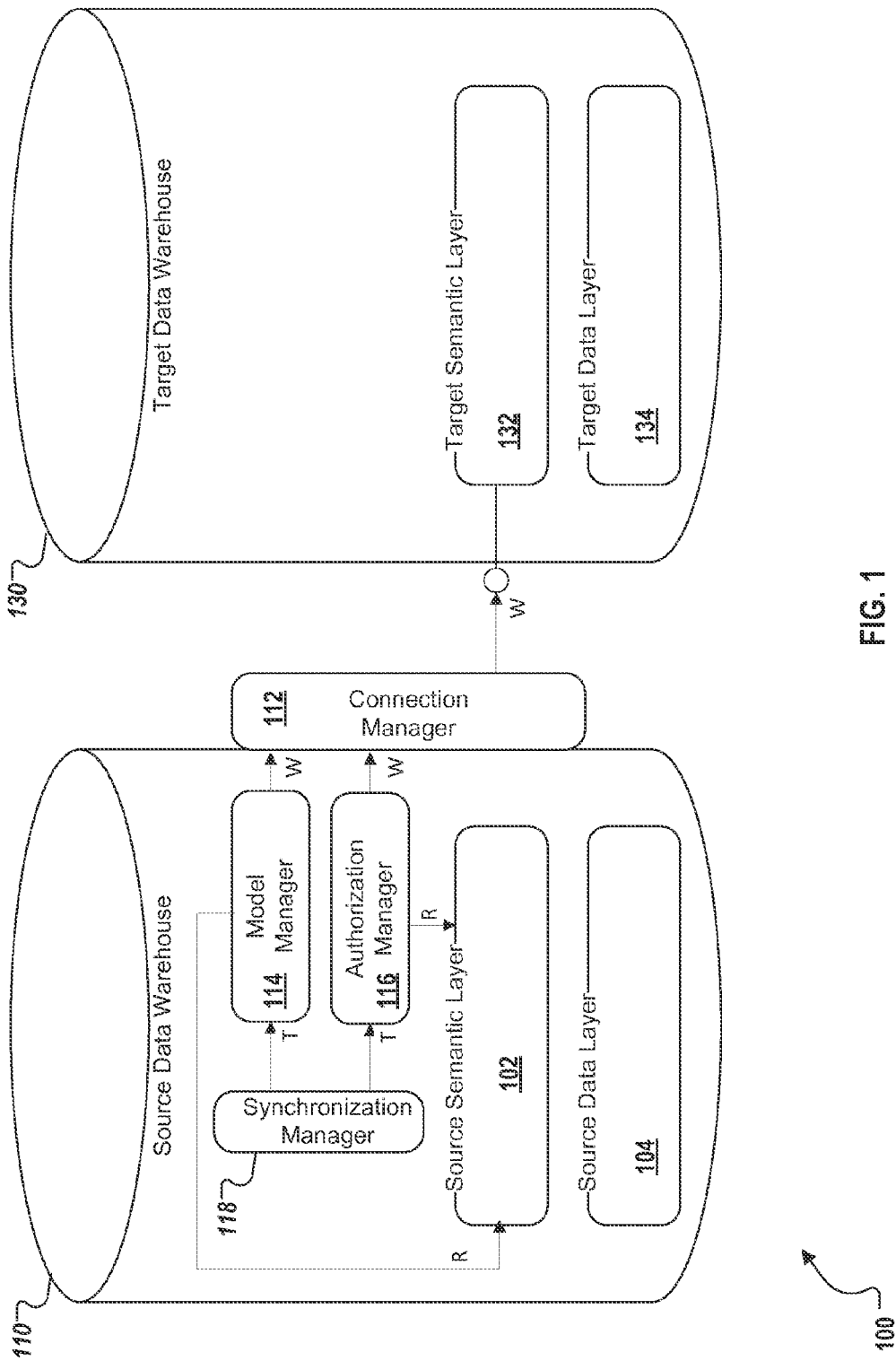
FIG. 1 is a high-level architecture block diagram illustrating a data warehouse model federation system according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

A data warehouse can store information and make the information semantically enriched. The data warehouse can make a semantically enriched model available to some or all of the users that can access the data warehouse. In general, a semantically enriched model provides a conceptual data model for the associated data. In some cases, a semantically enriched model can provide descriptions of the associated data. These descriptions can enable the user to understand the meanings of the associated data. In some cases, a semantically enriched model can also provide abstractions of the associated data. For example, an enterprise data warehouse can store data related to business information. These data can include customer numbers and revenue numbers for each individual customer over multiple years. The enterprise data warehouse can also store semantically enriched models associated with these data. For example, a semantically enriched model can describe the nature of these data, e.g., whether the data is a customer number, a year, or a revenue number. Another semantically enriched model can describe an abstraction of the data, e.g., a presentation of the top three customers by revenue in the last three years. Furthermore, a semantically enriched model can include one or more of the following aspects:

Unit or currency conversion. For example, revenue can be stored with different currencies, and accessing the data via the semantic model can convert revenue numbers to a specific currency, Data, mathematical or business functions, e.g., maximum, minimum, multiplication, division, trigonometric operations, percentage operations, Boolean logic, Display settings such as number of decimal places and result set rendering. For example, negative numbers can be colored in red in a semantically enriched model, Inventory or stock coverage measures. For example, a semantically enriched module can include calculations of the stockpile of a product to a given date in the past or the time that the stockpile will reach a predetermined amount in the future, and Variables. the target currency can be set dynamically for the revenue while accessing the data via the semantic model.

A client can create, modify, or delete the semantically enriched models. A client can represent an application, set of applications, software, software modules, or combination of software and hardware that can be used to interact with the data warehouse. Typically, a client accesses the semantically enriched model in the data warehouse through an interface of the data warehouse. In some cases, the interface is proprietary to the data warehouse. Therefore, if a client of a target data warehouse intends to access a semantically enriched model in a source data warehouse, the client may be enhanced to include the capabilities to interact with the proprietary interface of the source data warehouse. However, this approach increases complexities of the client, and thus may not be efficient. In some cases, this approach may also be infeasible because the source data warehouse may restrict accesses from clients of other data warehouses. Therefore, a data warehouse model federation method can be used to transform the semantically enriched models from the source data warehouse to the target warehouse.

Note that the described data warehouse model federation system should not limit the described subject matter to the illustrated examples. In other possible implementations, there can be a specific system for the transformation of the semantically enriched models.

FIG. 1 is a high-level architecture block diagram illustrating a data warehouse model federation system 100 for implementing a data warehouse model federation process according to an implementation. At a high level, the illustrated data warehouse model federation system 100 includes a source data warehouse 110 that is communicably coupled with a target data warehouse 130. The described illustration is only one possible implementation of the described subject matter and is not intended to limit the disclosure to the single described implementation. Those of ordinary skill will appreciate the fact that the described components can be connected, combined, and used in alternative ways consistent with this disclosure.

A data warehouse, e.g., the source data warehouse 110 and the target data warehouse 130, represents any application, set of applications, software, software modules, hardware, or combination of software and hardware that can be used to store data. In some cases, the data warehouse can be an enterprise data warehouse that stores business information. The data warehouse can also store semantically enriched models that are associated with the data. In the illustrated example, the source data warehouse 110 stores a semantically enriched model that can be transformed and pushed to the target data warehouse 130.

In the illustrated example, the target data warehouse 130 includes a target data layer 134 and a target semantic layer 132. The target data layer 134 represents an application, set of applications, software, software modules, hardware, or combination of software and hardware that can be used to store data. In some implementations, the data stored in the target data layer 134 can be accessed through a Structured Query Language (SQL) interface.

The target semantic layer 132 represents an application, set of applications, software, software modules, hardware, or combination of software and hardware that can be used to create semantically enriched models. The target semantic layer 132 can include an interface for a client to create, access, modify, or delete a semantically enriched model. In some cases, the interface is proprietary to the target data warehouse.

In the illustrated example, the source data warehouse 110 includes a source data layer 104, a source semantic layer 102, a connection manager 112, a model manager 114, an authorization manager 116, and a synchronization manager 118.

The source data layer 104 represents an application, set of applications, software, software modules, hardware, or combination of software and hardware that can be used to store data. In some implementations, the data stored in the source data layer 104 can be accessed through a Structured Query Language (SQL) interface.

The source semantic layer 102 represents an application, set of applications, software, software modules, hardware, or combination of software and hardware that can be used to create semantically enriched models. The source semantic layer 102 can include an interface for a client to create, access, modify, or delete a semantically enriched model. In some cases, the interface is proprietary to the source data warehouse. In some cases, the interface to the source semantic layer 102 is different than the interface to the target semantic layer 132. In the illustrated example, the source semantic layer 102 includes a source semantically enriched model that can be transformed and pushed to the target semantic layer 132.

Figure 3:
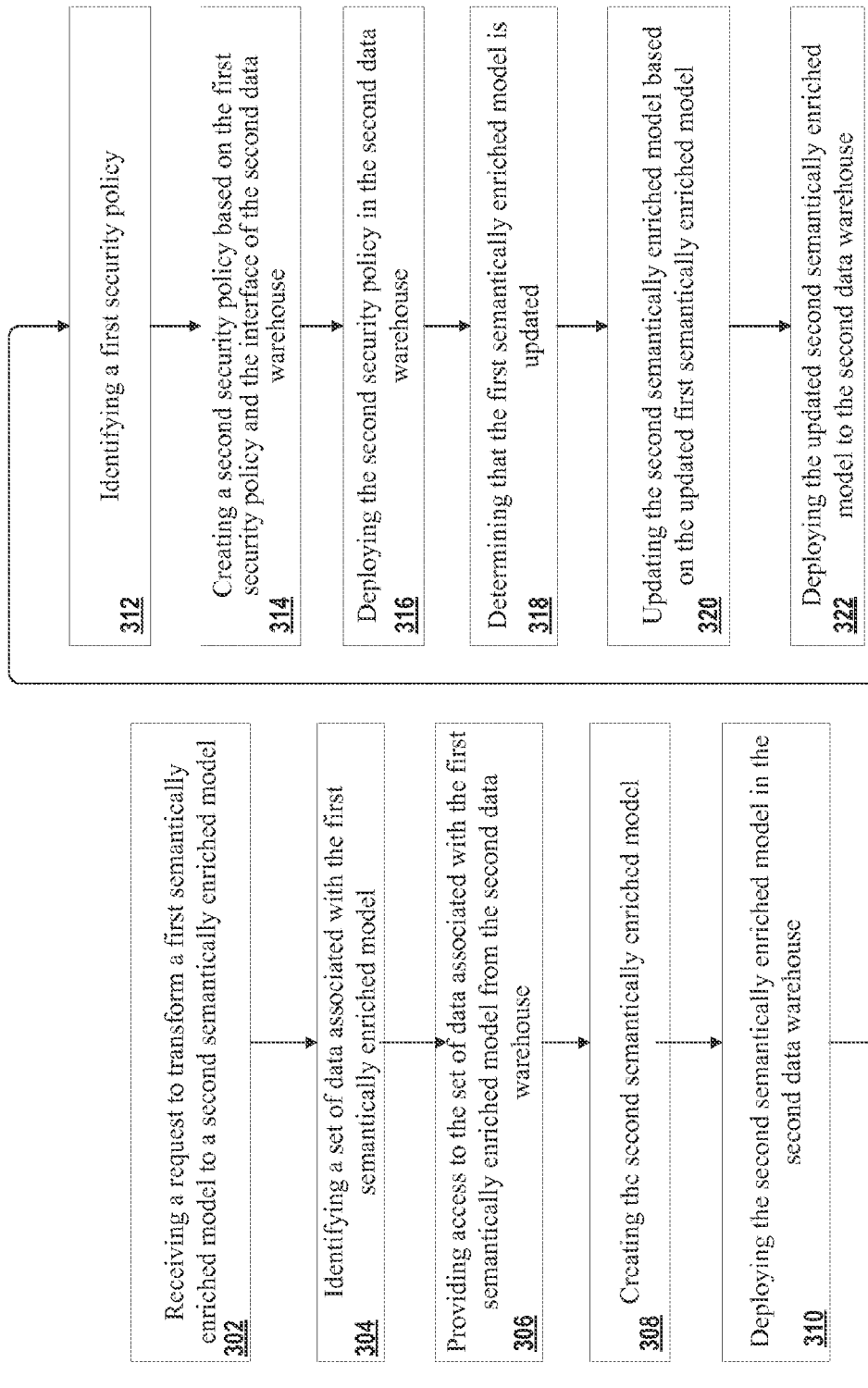
FIG. 3 is a flow diagram of a method illustrating a data warehouse model federation process according to an implementation.

The connection manager 112 represents an application, set of applications, software, software modules, hardware, or combination of software and hardware that can be used to establish connections to the target data warehouse 130. The connection manager 112 can be used by the authorization manager 116 and the model manager 114 to deploy objects in the target data warehouse 130. For example, the connection manager 112 can be used by the model manager 114 to execute a write operation to write a semantically enriched model into the target data warehouse 130. The connection manager 112 can also be used by the authorization manager 116 to execute a write operation to write a security policy into the target data warehouse 130. FIG. 3 and associated descriptions provide detailed descriptions of these processes.

The model manager 114 represents an application, set of applications, software, software modules, hardware, or combination of software and hardware that can be used to transform a semantically enriched model in the source data warehouse 110 to the target data warehouse 130. In some implementations, the model manager 114 can execute a read operation to retrieve the semantically enriched model from the source semantic layer 102, transform the semantically enriched model based on the interface to the target semantic layer 132, and deploy the transformed semantically enriched model in the target semantic layer 132. The model manager 114 can also provide access data associated with the semantically enriched model to clients of the target data warehouse 130. FIG. 3 and associated descriptions provide detailed descriptions of these processes.

The authorization manager 116 represents an application, set of applications, software, software modules, hardware, or combination of software and hardware that can be used to transform security policies associated with a semantically enriched model. In some instances, one or more security policies can be associated with a semantically enriched model. For example, a security policy can include an authorization definition for a user-model pair. The authorization definition can restrict a user's permission to access the data that is associated with the model. In some implementations, the authorization manager 116 can execute a read operation to retrieve a security policy associated with the semantically enriched model from the source semantic layer 102, transform the security policy based on the interface to the target semantic layer 132, and deploy the transformed security policy in the target semantic layer 132. FIG. 3 and associated descriptions provide detailed descriptions of these processes.

The synchronization manager 118 represents an application, set of applications, software, software modules, hardware, or combination of software and hardware that can be used to synchronize the semantically enriched models and their associated security policies in the target data warehouse 130 with the source data warehouse 110. In some cases, the semantically enriched models transformed in the target data warehouse 130 are part of the lifecycle of the model in the source data warehouse 110. Therefore, the synchronization manager 118 can detect changes made to the semantically enriched models and their associated security policies, and trigger the model manager 114 and the authorization manager 116 to create updates based on these changes and apply these changes to the target data warehouse 130. FIG. 3 and associated descriptions provide detailed descriptions of these processes.

While portions of the software elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
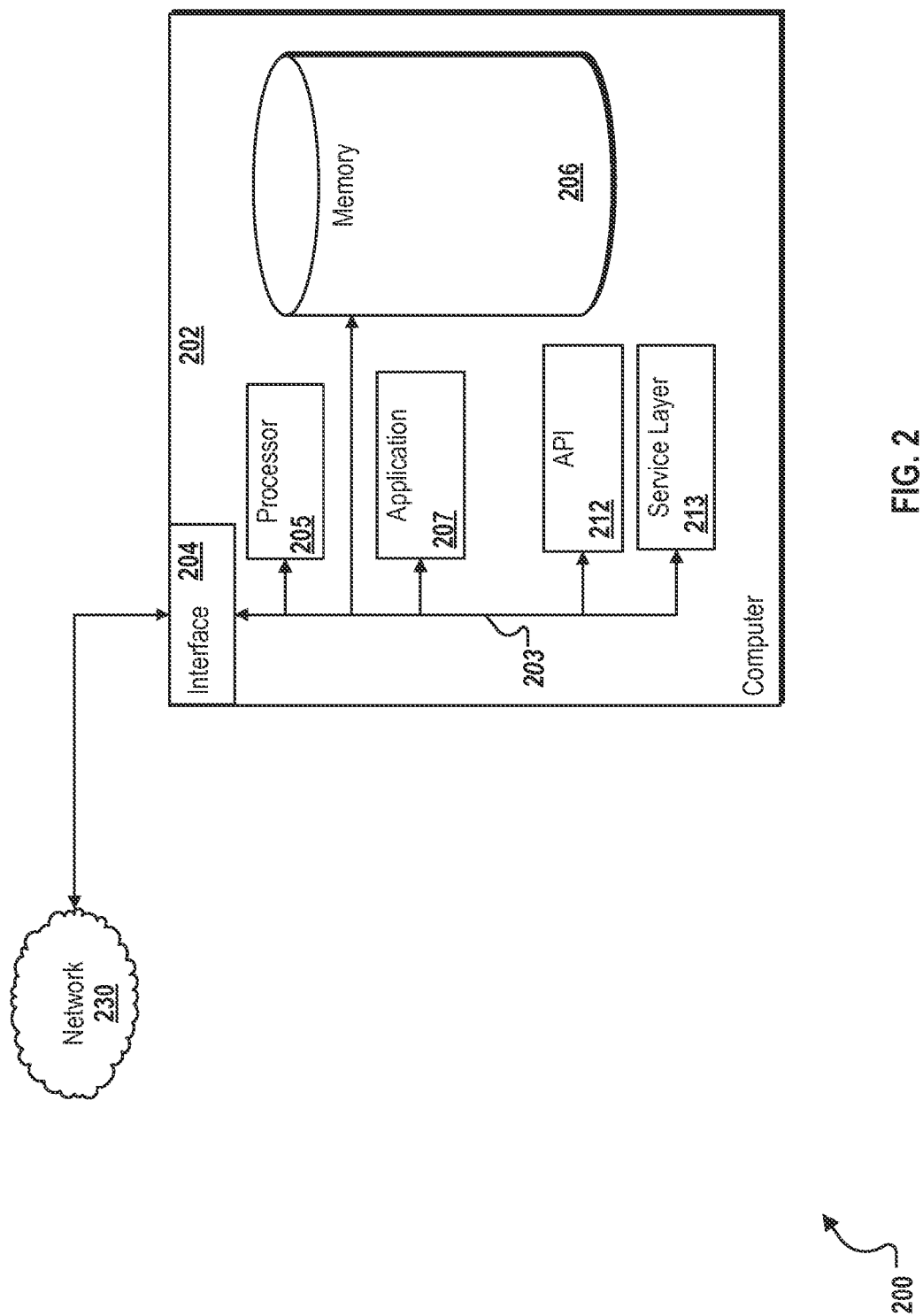
FIG. 2 is a block diagram of an exemplary computer used in a data warehouse model federation system according to an implementation.

FIG. 2 is a block diagram 200 of an exemplary computer used in the data warehouse model federation process according to an implementation. The illustrated computer 202 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 202 may comprise a computer that includes an input device, such as a keypad, keyboard, touch screen, or other device that can accept user information, and an output device that conveys information associated with the operation of the computer 202, including digital data, visual and/or audio information, or a GUI.

The computer 202 can serve as a client, network component, a server, a database or other persistency, and/or any other component of the data warehouse model federation system 100. The illustrated computer 202 is communicably coupled with a network 230. In some implementations, one or more components of the computer 202 may be configured to operate within a cloud-computing-based environment.

At a high level, the computer 202 is an electronic computing device operable to receive, transmit, process, store, or manage data and information associated with the data warehouse model federation system 100. According to some implementations, the computer 202 may also include or be communicably coupled with an application server, e-mail server, web server, caching server, streaming data server, business intelligence (BI) server, and/or other server.

The computer 202 can receive requests over network 230 from a client application (e.g., executing on another computer 202) and respond to the received requests by processing the said requests in an appropriate software application. In addition, requests may also be sent to the computer 202 from internal users (e.g., from a command console or by another appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer language-independent or -dependent and refer to a complete interface, a single function, or even a set of APIs. The service layer 213 provides software services to the computer 202 and/or the data warehouse model federation system 100. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in Extensible Markup Language (XML) format or other suitable format. While illustrated as an integrated component of the computer 202, alternative implementations may illustrate the API 212 and/or the service layer 213 as stand-alone components in relation to other components of the computer 202 and/or data warehouse model federation system 100. Moreover, any or all parts of the API 212 and/or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or data warehouse model federation system 100. The interface 204 is used by the computer 202 for communicating with other systems in a distributed environment—including within the data warehouse model federation system 100—connected to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated data warehouse model federation system 100.

The computer 202 includes a processor 205. Although illustrated as a single processor 205 in FIG. 2, two or more processors may be used according to particular needs, desires, or particular implementations of the computer 202 and/or the data warehouse model federation system 100. Generally, the processor 205 executes instructions and manipulates data to perform the operations of the computer 202. Specifically, the processor 205 executes the functionality required for data warehouse model federation.

The computer 202 also includes a memory 206 that holds data for the computer 202 and/or other components of the data warehouse model federation system 100. Although illustrated as a single memory 206 in FIG. 2, two or more memories may be used according to particular needs, desires, or particular implementations of the computer 202 and/or the data warehouse model federation system 100. While memory 206 is illustrated as an integral component of the computer 202, in alternative implementations, memory 206 can be external to the computer 202 and/or the data warehouse model federation system 100.

The application 207 is an algorithmic software engine providing functionality according to particular needs, desires, or particular implementations of the computer 202 and/or the data warehouse model federation system 100, particularly with respect to functionality required for data warehouse model federation. For example, application 207 can serve as one or more components/applications described in FIGS. 1-3. Further, although illustrated as a single application 207, the application 207 may be implemented as multiple applications 207 on the computer 202. In addition, although illustrated as integral to the computer 202, in alternative implementations, the application 207 can be external to the computer 202 and/or the data warehouse model federation system 100.

There may be any number of computers 202 associated with, or external to, the data warehouse model federation system 100 and communicating over network 230. Further, the term "client," "user," and other appropriate terminology may be used interchangeably as appropriate without departing from the scope of this disclosure. Moreover, this disclosure contemplates that many users may use one computer 202, or that one user may use multiple computers 202.

FIG. 3 is a flow diagram of a method 300 illustrating a data warehouse model federation process according to an implementation. For clarity of presentation, the description that follows generally describes method 300 in the context of FIGS. 1-2. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

At 302, a request to transform a first semantically enriched model to a second semantically enriched model can be received. In some cases, the first semantically enriched model can operate in a source data warehouse. In some cases, the first semantically enriched model can be annotated with the information that the first semantically enriched model and the data associated with the first semantically enriched model can be made available in a target data warehouse, where the second semantically enriched model can operate. In some cases, the request can be generated by a user who desires such a transforming. In some cases, the request can be generated by an administrator. In response to the request, a connection manager can establish a connection to the target date warehouse. From 302, method 300 proceeds to 304.

At 304, a model manager can identify a set of data associated with the first semantically enriched model. In general, a set of data that is associated with a model can be the data that the model operates on. For example, if the first semantically enriched model provides an abstraction of a ranking of revenue data by customers, a set of data that is associated with the first semantically enriched model can include customer numbers and revenues for each customer. In some cases, the model manager can evaluate the interface of the target data warehouse to determine whether a semantic meaning of an element of the first semantically enriched model may be created in the target data warehouse. The interface can be a proprietary interface that is used to create a semantically enriched model in the target data warehouse. In some cases, the model manager can determine that an element may not be created in the target data warehouse, and therefore remove the data associated with the element from the identified set of data. From 304, method 300 proceeds to 306.

At 306, the model manager can provide an access to the set of data associated with the first semantically enriched model from the second data warehouse. In some implementations, the model manager can provide the access through replication. For example, the model manager can initiate a write operation to write the set of data to the target data warehouse. In some implementations, the write operation can be performed by the connection manager. In some implementations, the model manager can provide the access to the set of data through a virtual access scheme. For example, the model manager can create a pointer in the second data warehouse. The pointer can point to the set of data associated with the first semantically enriched model. Therefore, the target data warehouse can access the set of data through the pointer. From 306, method 300 proceeds to 308.

At 308, the model manager can create the second semantically enriched model. The model manager can create the second semantically enriched model by using the interface of the target data warehouse. Based on the interface, the model manager can calculate the parameters that are used to create the second semantically enriched model.

In some implementations, the interface of the target data warehouse can be in the form of an Application Program Interface (API). In some cases, the API can have a specific signature. In one example, a caller of the API can provide a name and a definition of a semantically enriched model to create the semantically enriched model. In this example, the definition can be in the Extensible Markup Language (XML) form. In this example, the model manager can create a first definition of the first semantically enriched model in XML. The following represents an example definition of the first semantically enriched model:

```
<sourceWarehouseSemanticModel>
<name = "QuarterEndRevenueReport">
<characteristics>
<characteristic name="Country" datatype="string" />
<characteristic name="Quarter" datatype="Date"/>
</characteristics>
<keyfigures>
<keyfigure name="Revenue_total" datatype="SAP_float" targetCurrency="USD"/>
<keyfigure name="Revenue_quarter" datatype="SAP_float" restriction='"Quarter" = 201401 ' />
</keyfigures>
</sourceWarehouseSemanticModel>
```

The model manager can determine whether the first definition is compatible with the API of the interface for the target data warehouse. In this example, the model manager identifies that the data type "SAP_float" is not compatible with the API. For example, the data type "SAP_float" may be a proprietary data type of the source data warehouse that is not used in the target data warehouse. The model manager can transform incompatible definitions to compatible definitions. For example, the model manager can transform the data type "SAP_float" to the corresponding data types that are compatible to the API. The following represents an example definition of the second semantically enriched model after the incompatible data types are transformed:

```
<targetWarehouseSemanticModel>
<name = "QuarterEndRevenueReport">
<attributes>
<attribute name="Country" datatype="string" />
<attribute name="Quarter" datatype="Date"/>
</attributes>
<measures>
<measure name="Revenue_total" datatype="IEEE_float" targetCurrency="USD"/>
<measure name="Revenue_quarter" datatype="IEEE_float" selection='"Quarter" = 201401 ' />
</measures>
</targetWarehouseSemanticModel>
```

In some cases, the model manager can identify one or more elements in the first semantically enriched model that may not be expressed in the second semantically enriched model. For example, the first semantically enriched model may include a calculation that displays the names of the top N countries with the most revenue, while the target warehouse may not be capable of performing such a calculation. In these or other cases, the model manager can omit this element when creating the second semantically enriched model.

From 308, method 300 proceeds to 310. At 310, the model manager can deploy the second semantically enriched model in the second data warehouse. For example, the model manager can call the API of the target data warehouse, providing the name, e.g., "QuarterEndRevenueReport," and the definition of the second semantically enriched model that is created at 308. This function call can deploy the second semantically enriched model in the second data warehouse. In some cases, the model manager can use the connection manager in deploying the second semantically enriched model. From 310, method 300 proceeds to 312.

At 312, an authorization manager can identify a first security policy associated with the first semantically enriched model. In some implementations, the first security policy can be encapsulated within an authorization object. This authorization object can include a list of dimensions. Each dimension can represent a column in the first semantically enriched model and can be used during data selection to restrict the selected data. The allowed values for each column can be defined within the corresponding dimension of the authorization object. From 312, method 300 proceeds to 314.

At 314, the authorization manager can create a second security policy that is associated with the second semantically enriched model. The creation can be based on the first security policy and the interface of the target data warehouse. For example, the interface of the target data warehouse may specify that a security policy can be represented by a filter string. The filter string can be added to the generated SQL statement when selecting data from the corresponding model. In such an example, the authorization manager can transform the authorization object of the first security policy into a filter string of the second security policy.

In some implementations, the second security policy can restrict a client's ability to access more data in the target data warehouse than in the source data warehouse. In some cases, the authority manager can transform all the elements in the first security policy into the second security policy. In these or other cases, a client can access the same amount of data in the second data warehouse as in the first data warehouse. In some cases, due to the limitation of the API of the target data warehouse, the authority manager may not be able to transform all the elements in the first security policy into the second security policy. In these or other cases, the authorization manager can include additional restrictions in the second security policy so that the client may access all or a subset of data that the client can access in the source data warehouse, but not more. From 314, method 300 proceeds to 316.

At 316, the authorization manager can deploy the second security policy. In some implementations, the second security policy can be deployed by calling the API of the target data warehouse. In some cases, the authorization manager can use the connection manager in deploying the second security policy. From 316, method 300 proceeds to 318.

At 318, the synchronization manager can determine that the first semantically enriched model is updated. In some cases, the synchronization manager can also determine that the first security policy is updated. From 318, method 300 proceeds to 320.

At 320, the synchronization manager can update the second semantically enriched model based on the updated first semantically enriched model. In some implementations, the synchronization manager can trigger the model manager to create an updated version of the second semantically enriched model based on the updated first semantically enriched model. In some implementations, the updated second semantically enriched model can include the differences between the previous version and the update version of the second semantically enriched model.

In some implementations, the synchronization manager can also update the second security policy based on the updated first security policy. In some implementations, the synchronization manager can trigger the authorization manager to create an updated version of the second security policy based on the updated first security policy. In some implementations, the updated second security policy can include the differences between the previous version and the updated version of the second security policy. From 320, method 300 proceeds to 322.

At 322, the synchronization manager can deploy the updated second semantically enriched model. In some implementations, the synchronization manager can instruct the model manager to deploy the updated second semantically enriched model. In some implementations, the synchronization manager can deploy the updated second security policy. In some implementations, the synchronization manager can instruct the authorization manager to deploy the updated second security policy. After 322, method 300 stops.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method, comprising:
receiving a request to transform a first semantically enriched model to a second semantically enriched model, wherein the first semantically enriched model is stored and operates in a first data warehouse and the second semantically enriched model operates in a second data warehouse;
identifying a set of data associated with the first semantically enriched model, wherein the set of data is stored in the first data warehouse;
creating the second semantically enriched model in the first data warehouse based on the first semantically enriched model by using an interface of the second data warehouse to calculate parameters used to create the second semantically enriched model, wherein the interface of the second data warehouse is configured by an interface of the first data warehouse to provide access from the second data warehouse to the set of data associated with the first semantically enriched model stored in the first data warehouse, wherein the interface of the second data warehouse is different from the interface of the first data warehouse, wherein the interface of the first data warehouse provides access to the first semantically enriched model, and wherein creating the second semantically enriched model comprises:
creating a first definition of the first semantically enriched model;
identifying a first data type in the first definition that is not compatible with the interface of the second data warehouse;
transforming the first data type into a second data type that is compatible with the interface of the second data warehouse;
creating a second definition based on the first definition, wherein the second definition comprises the second data type; and
creating the second semantically enriched model based on the second definition using the interface of the second data warehouse; and
deploying, from the first data warehouse and into the second data warehouse, the second semantically enriched model, wherein the interface of the second data warehouse provides access to the second semantically enriched model deployed in the second data warehouse, and provides no access to the first semantically enriched model stored in the first data warehouse.

2. The method of claim 1, further comprising:
identifying a first security policy associated with the first semantically enriched model;
creating a second security policy based on the first security policy and the interface of the second data warehouse; and
deploying the second security policy in the second data warehouse.

3. The method of claim 1, further comprising:
determining that the first semantically enriched model is updated;
updating the second semantically enriched model based on the updated first semantically enriched model; and
deploying the updated second semantically enriched model in the second data warehouse.

4. The method of claim 1, wherein providing access to the set of data comprises replicating the set of data in the second data warehouse.

5. The method of claim 1, wherein providing access to the set of data comprises providing a virtual access to the set of data from the second data warehouse.

6. The method of claim 1, wherein the first and the second definition is formatted according to Extensible Markup Language (XML).

7. A system, comprising:
a memory; and
at least one hardware processor interoperably coupled with the memory and configured to:
receive a request to transform a first semantically enriched model to a second semantically enriched model, wherein the first semantically enriched model is stored and operates in a first data warehouse and the second semantically enriched model operates in a second data warehouse;
identify a set of data associated with the first semantically enriched model, wherein the set of data is stored in the first data warehouse;
create the second semantically enriched model in the first data warehouse based on the first semantically enriched model by using an interface of the second data warehouse to calculate parameters used to create the second semantically enriched model, wherein the interface of the second data warehouse is configured by an interface of the first data warehouse to provide access from the second data warehouse to the set of data associated with the first semantically enriched model stored in the first data warehouse, wherein the interface of the second data warehouse is different from the interface of the first data warehouse, wherein the interface of the first data warehouse provides access to the first semantically enriched model, and wherein creating the second semantically enriched model comprises:
creating a first definition of the first semantically enriched model;
identifying a first data type in the first definition that is not compatible with the interface of the second data warehouse;
transforming the first data type into a second data type that is compatible with the interface of the second data warehouse;
creating a second definition based on the first definition, wherein the second definition comprises the second data type; and
creating the second semantically enriched model based on the second definition using the interface of the second data warehouse; and
deploy, from the first data warehouse and into the second data warehouse, the second semantically enriched model, wherein the interface of the second data warehouse provides access to the second semantically enriched model deployed in the second data warehouse, and provides no access to the first semantically enriched model stored in the first data warehouse.

8. The system of claim 7, wherein the at least one hardware processor is further configured to:
identify a first security policy associated with the first semantically enriched model;
create a second security policy based on the first security policy and the interface of the second data warehouse; and deploy the second security policy in the second data warehouse.

9. The system of claim 7, wherein the at least one hardware processor is further configured to:
  determine that the first semantically enriched model is updated;
  update the second semantically enriched model based on the updated first semantically enriched model; and
  deploy the updated second semantically enriched model in the second data warehouse.

10. The system of claim 7, wherein providing access to the set of data comprises replicating the set of data in the second data warehouse.

11. The system of claim 7, wherein providing access to the set of data comprises providing a virtual access to the set of data from the second data warehouse.

12. The system of claim 7, wherein the first and the second definition is formatted according to Extensible Markup Language (XML).

13. A non-transitory, computer-readable medium storing computer-readable instructions for data warehouse model federation, the instructions executable by a computer and configured to:
  receive a request to transform a first semantically enriched model to a second semantically enriched model, wherein the first semantically enriched model is stored and operates in a first data warehouse and the second semantically enriched model operates in a second data warehouse;
  identify a set of data associated with the first semantically enriched model, wherein the set of data is stored in the first data warehouse;
  create the second semantically enriched model in the first data warehouse based on the first semantically enriched model by using an interface of the second data warehouse to calculate parameters used to create the second semantically enriched model, wherein the interface of the second data warehouse is configured by an interface of the first data warehouse to provide access from the second data warehouse to the set of data associated with the first semantically enriched model stored in the first data warehouse, wherein the interface of the second data warehouse is different from the interface of the first data warehouse, wherein the interface of the first data warehouse provides access to the first semantically enriched model, and wherein creating the second semantically enriched model comprises:
    creating a first definition of the first semantically enriched model;
    identifying a first data type in the first definition that is not compatible with the interface of the second data warehouse;
    transforming the first data type into a second data type that is compatible with the interface of the second data warehouse;
    creating a second definition based on the first definition, wherein the second definition comprises the second data type; and
    creating the second semantically enriched model based on the second definition using the interface of the second data warehouse; and
  deploy, from the first data warehouse and into the second data warehouse, the second semantically enriched model, wherein the interface of the second data warehouse provides access to the second semantically enriched model deployed in the second data warehouse, and provides no access to the first semantically enriched model stored in the first data warehouse.

14. The non-transitory, computer-readable medium of claim 13, wherein the instructions are further configured to:
  identify a first security policy associated with the first semantically enriched model;
  create a second security policy based on the first security policy and the interface of the second data warehouse; and
  deploy the second security policy in the second data warehouse.

15. The non-transitory, computer-readable medium of claim 13, wherein the instructions are further configured to:
  determine that the first semantically enriched model is updated;
  update the second semantically enriched model based on the updated first semantically enriched model; and
  deploy the updated second semantically enriched model in the second data warehouse.

16. The non-transitory, computer-readable medium of claim 13, wherein providing access to the set of data comprises replicating the set of data in the second data warehouse.

17. The non-transitory, computer-readable medium of claim 13, wherein providing access to the set of data comprises providing a virtual access to the set of data from the second data warehouse.

* * * * *